United States Patent
Ji et al.

(10) Patent No.: US 11,069,327 B2
(45) Date of Patent: Jul. 20, 2021

(54) METHOD FOR CONTROLLING FRAME REFRESH RATE OF SCREEN, APPARATUS AND STORAGE MEDIUM

(71) Applicant: BEIJING XIAOMI MOBILE SOFTWARE CO., LTD., Beijing (CN)

(72) Inventors: Donglei Ji, Beijing (CN); Guilin Zhong, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 16/699,637

(22) Filed: Nov. 30, 2019

(65) Prior Publication Data

US 2021/0065658 A1    Mar. 4, 2021

(30) Foreign Application Priority Data

Aug. 28, 2019   (CN) .......................... 201910803943.0

(51) Int. Cl.
*G09G 5/37* (2006.01)
*G06F 3/041* (2006.01)

(52) U.S. Cl.
CPC .............. *G09G 5/37* (2013.01); *G06F 3/0416* (2013.01); *G09G 2320/0613* (2013.01); *G09G 2320/103* (2013.01); *G09G 2330/023* (2013.01); *G09G 2354/00* (2013.01); *G09G 2370/022* (2013.01)

(58) Field of Classification Search
CPC ................................ G09G 5/37; G06F 3/0416
See application file for complete search history.

(56) References Cited

U.S. PATENT DOCUMENTS

| | | | |
|---|---|---|---|
| 7,161,577 B2* | 1/2007 | Hirakata | G09G 3/342 345/102 |
| 10,497,295 B1* | 12/2019 | Jia | G09G 3/02 |
| 2009/0085849 A1* | 4/2009 | Chung | G09G 3/3648 345/89 |
| 2012/0236021 A1* | 9/2012 | Parmar | G09G 3/3466 345/597 |
| 2013/0147783 A1* | 6/2013 | Yamauchi | H01L 27/1255 345/212 |
| 2014/0210832 A1 | 7/2014 | Wang et al. | |
| 2014/0267448 A1* | 9/2014 | Albrecht | G09G 3/2007 345/690 |
| 2016/0086526 A1* | 3/2016 | Kim | G09G 3/2092 345/698 |
| 2017/0308226 A1* | 10/2017 | Yoo | G06F 3/04817 |
| 2018/0261191 A1* | 9/2018 | Yi | G09G 5/14 |
| 2019/0043435 A1 | 2/2019 | Yang et al. | |
| 2019/0172427 A1 | 6/2019 | Saini et al. | |

OTHER PUBLICATIONS

Extended European search report of counterpart EP application No. 20152167.1 dated Jun. 17, 2020.

* cited by examiner

*Primary Examiner* — Chun-Nan Lin
(74) *Attorney, Agent, or Firm* — Syncoda LLC; Feng Ma

(57) ABSTRACT

A method for controlling a frame refresh rate of a screen can be executed by a terminal including a display screen and include: acquiring a first target frame rate, wherein the first target frame rate is a maximum frame refresh rate corresponding to a display scene of the terminal; setting a second tartlet frame rate that is not greater than the first target frame rate as a frame refresh rate of the display screen; and setting the first target frame rate as the frame refresh rate of the display screen when the terminal receives a user operation by a user on the display interface.

14 Claims, 4 Drawing Sheets

METHOD FOR CONTROLLING FRAME REFRESH RATE OF SCREEN, APPARATUS AND STORAGE MEDIUM

CROSS-REFERENCE TO RELATED APPLICATION

The present application claims priority to Chinese Patent Application No. 201910803943.0 filed Aug. 28, 2019, the disclosure of which is hereby incorporated by reference in its entirety.

BACKGROUND

With the continuous development of display technologies, a high frame rate has become trendy, while higher requirements on a display effect and the power consumption of a terminal are also desired.

In order to reduce the power consumption of the terminal while maintaining the display effect, a minimum frame rate can be provided for the frame refresh rate of a display screen of a terminal. The frame refresh rate of the display screen is switched to the minimum frame rate when a picture displayed the terminal is not refreshed for a long time.

SUMMARY

The present disclosure relates generally to display technologies, and more specifically to a method for controlling a frame refresh rate of a screen, an apparatus and a storage medium.

At least one embodiment of the present disclosure provides a method for controlling a frame refresh rate of a screen, wherein the method is executed by a terminal comprising a display screen and comprises:

acquiring a first target frame rate, wherein the first target frame rate is a maximum frame refresh rate corresponding to a display scene of the terminal, and the display scene is a scene classified based on a type of a display interface on the display screen;

when receiving no user operation on the display interface, setting a second target frame rate that is not greater than the first target frame rate as a frame refresh rate of the display screen; and setting the first target frame rate as the frame refresh rate of the display screen when receiving a user operation on the display interface.

At least one embodiment of the present disclosure provides an apparatus configured to control a frame refresh rate of a screen, wherein the apparatus is applicable to a terminal comprising a display screen and comprises:

a processor; and a memory configured to store an instruction executable by the processor, wherein the processor is configured to:

acquire a first target frame rate, wherein the first target frame rate is a maximum frame refresh rate corresponding to a display scene of the terminal, and the display scene is a scene classified based on a type of a display interface on the display screen;

set a second target frame rate that is not greater than the first target frame rate as a frame refresh rate of the display screen when no user operation on the display interface is received; and set the first target frame rate as the frame refresh rate of the display screen when receiving a user operation on the display interface.

At least one embodiment of the present disclosure provides a computer-readable storage medium, wherein at least one instruction, at least one segment of program and a code set or an instruction set are stored on the storage medium and loaded and executed by a processor to implement the method for controlling the refresh frame of the screen in the first aspect or any optional solution in the first aspect.

BRIEF DESCRIPTION OF THE DRAWINGS

The accompanying drawings, which are incorporated in and constitute a part of this specification, illustrate embodiments consistent with the present disclosure and serve to explain the principles of the present disclosure together with the description.

DETAILED DESCRIPTION

Reference will now be made in detail to exemplary embodiments, examples of which are illustrated in the accompanying drawings. The following description refers to the accompanying drawings in which the same reference signs in different drawings represent the same or similar elements unless otherwise represented. The implementations set forth in the following description of exemplary embodiments do not represent all implementations consistent with the present disclosure. Instead, they are merely examples of devices and methods consistent with aspects related to the disclosure as recited in the appended claims.

It is to be understood that the term "plurality" herein refers to two or more. "And/or" herein describes the correspondence of associated objects, and indicates three kinds of relationship. For example, A and/or B, can mean that: A exists alone, A and B exist concurrently, and B exists alone. The character "/" generally indicates that the preceding and succeeding associated objects have a relationship of "OR".

When the frame refresh rate of the display screen is the minimum frame rate, the terminal may respond to a user operation still at the minimum frame refresh rate if a user operation is detected, which can adversely affect the fluency of an interface interaction.

Various embodiments of the present disclosure provide a method for controlling a frame refresh rate of a screen. The method is executed by a terminal that comprises a display screen. Through real-time refresh of the frame refresh rate of the screen, the response effect to an interface interaction is guaranteed while controlling the power consumption of the display screen. The method for controlling the frame refresh rate of the screen will be described in detail with reference to the accompanying drawings.

First, some terms involved in the present disclosure will be explained.

(1) Terminal

In the embodiments of the present disclosure, a terminal can be a computing device with a display screen. For example, the terminal may be a mobile terminal such as a smart phone, a tablet PC, an e-book reader, etc., or, the terminal may be a smart wearable device such as a smart watch, or, the terminal may be a personal computer such as an all-in-one PC or a laptop.

Figure 1:
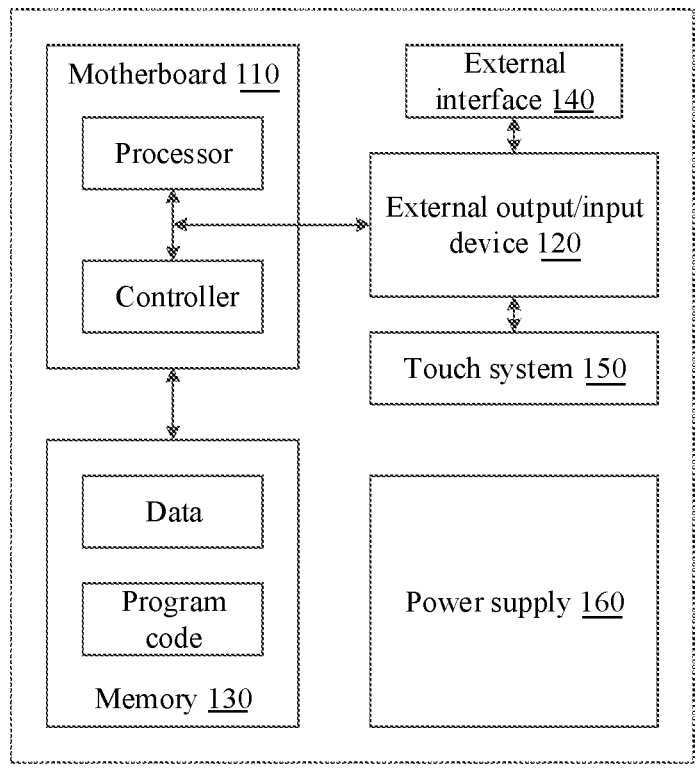
FIG. 1 is a schematic structural diagram of a terminal in accordance with one exemplary embodiment.

For example, please refer to FIG. 1, which is a schematic structural diagram of a terminal in accordance with one exemplary embodiment of the present disclosure. As illustrated in FIG. 1, the terminal comprises a motherboard 110, an external output/input device 120, a memory 130, an external interface 140, a touch system 150 and a power supply 160.

Processing elements such as a processor and a controller may be integrated in the motherboard 110.

The external output/input device 120 can comprise a display component (e.g., a display screen), an audio playing component (e.g., a speaker), an audio collecting component (e.g., a microphone), various buttons, etc.

The memory 130 comprises program codes and data stored thereon.

The external interface 140 can comprise an earphone jack, a charging interface, a data interface, etc.

The touch system 150 can be integrated in the display component or the buttons of the external output/input device 120, and is configured to detect a touch operation by a user on the display component or the buttons.

The power supply 160 is configured to supply power to all other parts of the terminal.

In the present embodiment, the processor in the motherboard 110 can generate an interface content by executing or invoking the program codes and the data stored in the memory, and the generated interface content is displayed by the external output/input device 120. During display of the interface content, the touch operation executed during an interaction between the user and the interface can be detected by the capacitive touch system 150, and buttons or other operations, e.g., a gesture operation and a voice operation, executed during the interaction between the user and the interface can be detected by the external output/input device 120.

(2) Frame Refresh Rate of the Display Screen

In the present embodiment, a frame refresh rate of the display screen refers to a physical refresh rate of a display, which is the number of times that an electron beam repeatedly scans an image on the screen, and is mainly determined by the display screen itself. The greater the frame refresh rate of the display screen is, the more stable the image displayed by the display is. For a liquid crystal display or an LED display, the frame refresh rate of the display screen can be understood as how many pictures are refreshed in a second.

The frame refresh rate of the screen is usually divided into a vertical frame refresh rate and a horizontal frame refresh rate. Generally, the frame refresh rate refers to the vertical frame refresh rate. The vertical frame refresh rate identifies how many times an image of the screen is redrawn in a second, namely, the number of times the screen is refreshed in a second. The greater the frame refresh rate is, the more stable the image is and the higher the definition of the image is, and the less harm caused to the eyes is. The lower the frame refresh rate is, the more severely the image flickers and shakes.

(3) Picture Frame Rate

In the present embodiment, a picture frame rate refers to a frequency at which a bitmap image in the unit of frame continuously appears on a display or a screen, and it generally refers to a rate at which pictures change when an application runs on a terminal. The frame rate of the application running on the terminal is determined by both a display scene and the performance of the terminal. The performance of the terminal mainly depends on the performance of a graphics processing unit (GPU). The better the GPU renders and draws a content that the display screen needs to display, the more fluency and the more realistic the pictures are. The more poorly the GPU renders and draws the content that the display screen needs to display, the more seriously the pictures get stuck.

(4) Frame Refresh Rate and Picture Frame Rate of the Display Screen

The frame refresh rate of the display screen determines a maximum picture frame rate that the user can see. For example, when the frame refresh rate of the display screen is up to 30 frames per second, even if the picture frame rate reaches 200 frames per second, the display screen only can "grab" 30 frames for display per second, and at last, the user can see only 30 frames of a picture per second. It can be concluded that the frame refresh rate of the display screen corresponds to the frame refresh rate of the picture that the user can see.

(5) Application Entry (UI Application)

A UI Application object is a symbol of an application. Each application has its own UI Application object, which is automatically created by a terminal system and can perform some application-level operations, such as setting application information reminders, or setting the visibility of a networking indicator, or setting status bars for the application, for jumping between applications.

In order to reduce the power consumption of the terminal while maintaining the display effect, in related arts, a minimum frame rate is provided for the frame refresh rate of a display screen of a terminal. The frame refresh rate of the display screen is switched to the minimum frame rate when a picture displayed the terminal is not refreshed for a long time.

In the above related arts, when the frame refresh rate of the display screen is the minimum frame rate, the terminal will respond to a user operation still at the minimum frame refresh rate if a user operation is detected, which adversely affects the fluency of an interface interaction.

Figure 2:
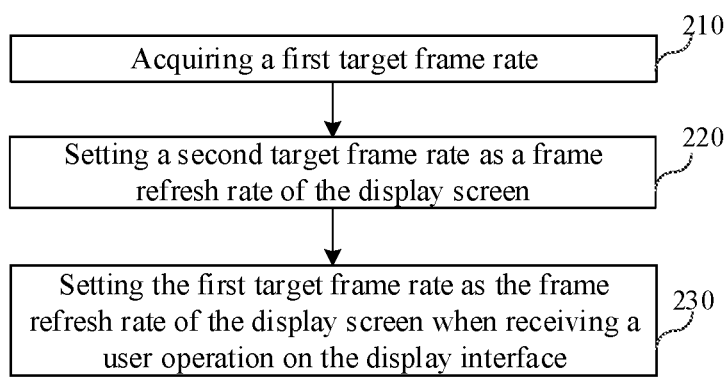
FIG. 2 is a flowchart of a method for controlling a frame refresh rate of a screen in accordance with one exemplary embodiment.

FIG. 2 is a flowchart of a method for controlling a frame refresh rate of a screen in accordance with one exemplary embodiment. The method is executed by a terminal comprising a display screen. For example, the terminal can be the terminal illustrated in FIG. 1. As illustrated in FIG. 2, the method for controlling the frame refresh rate of the screen comprises the following steps.

In step 210, a first target frame rate is acquired. The first target frame rate is a maximum frame refresh rate corresponding to a display scene of the terminal. The display scene is a scene classified based on a type of a display interface on the display screen.

In some embodiments, the display scene can be a user interface (UI) interaction scene, a video playing scene, a reading scene, and etc.

In step 220, a second target frame rate which is not greater than the first target frame rate is set as a frame refresh rate of the display screen.

In the present embodiment, when no use operation on the display interface is received, the terminal can set the second target frame rate as the frame refresh rate of the display screen, wherein the second target frame rate is equal to or lower than the first target frame rate.

In step 230, the first target frame rate is set as the frame refresh rate of the display screen when receiving a user operation on the display interface.

In some embodiments, the user operation can be an interaction, generated by a user who touches the display screen, with the display interface, or an interaction with the display interaction through a button operation, or an interaction with the display interface through a voice operation, or an interaction with the display interface through induction between a gesture and the display interface, or an interaction with the display interface through face recognition or a facial expression, or the like.

In some embodiments, the display screen is a touch display screen. Before setting the first target frame rate as the frame refresh rate of the display screen when receiving the user operation on the display interface, the method further comprises:

monitoring a touch event, wherein the touch event is an event generated when detecting a touch operation on the display screen by the terminal; and when the touch event is detected, determining that a user operation on the display interface is received.

In some embodiments, setting the first target frame rate as the frame refresh rate of the display screen comprises:

setting the first target frame rate as the frame refresh rate of the display screen when the user operation corresponding to the touch event is a valid operation, wherein the valid operation is an operation that triggers effective updating of content on the display interface.

In some embodiments, monitoring the touch event comprises:

monitoring the touch event when the second target frame rate is lower than the first target frame rate.

In some embodiments, before setting the second target frame rate as the frame refresh rate of the display screen, the method further comprises:

acquiring a picture frame rate of the display interface in real time, wherein the picture frame rate is a frequency at which a picture frame on the display interface changes; and determining the second target frame rate based on the picture frame rate that is acquired in real time.

In some embodiments, determining the second target frame rate based on the picture frame rate that is acquired in real time comprises:

determining a value of the picture frame rate as a value of the second target frame rate.

In some embodiments, acquiring the picture frame rate of the display interface in real time comprises:

acquiring a refresh time of n picture frames recently displayed on the display interface, wherein n is an integer more than or equal to 2;

acquiring a total refresh duration of the n picture frames based on the refresh time of the n picture frames; and acquiring a picture frame rate of the display interface based on the total refresh duration of the n picture frames.

In some embodiments, acquiring the total refresh duration of the n picture frames based on the refresh time of the n picture frames comprises:

acquiring the total refresh duration of the n picture frames based on the refresh time of the n picture frames when a time interval between any two adjacent picture frames in the n pictures is not greater than an interval threshold.

In some embodiments, acquiring the first target frame rate comprises:

receiving a frame refresh rate control instruction sent by a cloud server which is an instruction sent by the cloud server when monitoring that a display scene of the terminal has changed; and acquiring the first target frame rate indicated by the frame refresh rate control instruction.

As such, in the method for controlling the frame refresh rate of the screen according to the embodiments of the present disclosure, by acquiring the maximum frame refresh rate corresponding to the display scene of the terminal, setting the frame refresh rate of the display screen to be not greater than the maximum target frame rate corresponding to the display scene, and setting the maximum frame refresh rate corresponding to the display scene of the terminal as the frame refresh rate of the display screen when receiving a user operation, the frame refresh rate of the display screen can be adjusted if a user operation is received while the power consumption of the display screen of the terminal is controlled so as to guarantee the fluency of an interface interaction. Therefore, the response effect to the interface interaction is guaranteed while the power consumption of the display screen is controlled.

An operation by a user on the display interface may be one or more of a touch screen operation, a button operation, a voice operation, a gesture operation and face recognition or facial expression interaction operation. The solution involved in FIG. 2 will be explained by taking that the operation by the user on the display interface is a touch screen operation as an example.

Figure 3:
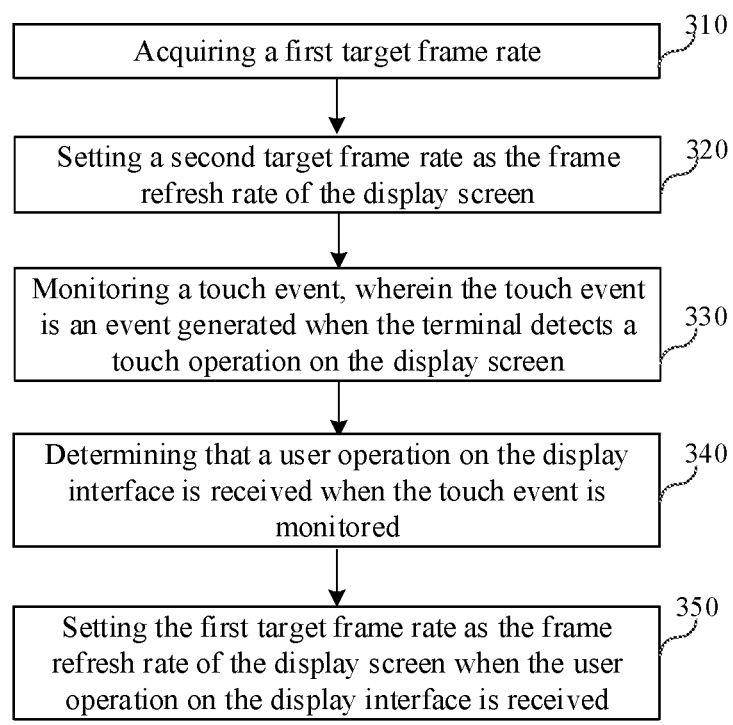
FIG. 3 is a flowchart of a method for controlling a frame refresh rate of a screen in accordance with another exemplary embodiment.

FIG. 3 is a flowchart of a method for controlling a frame refresh rate of a screen in accordance with one exemplary embodiment. The method is executed by a terminal comprising a display screen. For example, the terminal can be the terminal illustrated in FIG. 1. By taking that the display screen is a touch display screen and the user operation is a touch screen operation as an example, as illustrated in FIG. 3, the method for controlling the frame refresh rate of the screen comprises the following steps.

In step 310, a first target frame rate is acquired. The first target frame rate is a maximum frame refresh rate corresponding to a display scene of the terminal. The display scene is a scene classified based on a type of a display interface on the display screen.

For example, in the present embodiment, the display scene of the terminal can be classified into one or more scenes based on different types of display interfaces on the display screen of the terminal. For example, the display scene of the terminal can be classified into a reading and browsing scene, a video playing scene, a UI interaction scene, and etc. based on the types of the display interfaces.

For example, if a picture and/or document interface is currently displayed on the display screen of the terminal, the current display scene can be a reading and browsing scene.

If a video playing interface is currently displayed on the display screen of the current terminal, the current display scene can be a video playing scene.

If an interface currently displayed on the display screen of the terminal receives the user operation and responds to the user operation, the current display scene can be a UI interaction scene.

In some embodiments, acquiring the first target frame rate comprises:

receiving a frame refresh rate control instruction sent by a cloud server, which is an instruction sent by the cloud server when monitors that a display scene of the terminal has changed; and acquiring the first target frame rate indicated by the frame refresh rate control instruction In a possible embodiment provided by the present disclosure, the cloud server can monitor the display scene of the terminal. When monitoring that the display scene of the terminal has changed, the cloud server can match the changed display scene with a target display scene that needs to control the frame refresh rate of the display screen. In case of successful matching, the cloud server can send the frame refresh rate control instruction to the terminal. The terminal can acquire the maximum frame refresh rate, namely the first target frame rate, corresponding to the display scene of the terminal based on the frame refresh rate control instruction when receiving the frame refresh rate control instruction sent by the cloud server.

In an exemplary solution, the cloud server can send the frame refresh rate control instruction that carries a display scene identifier to the terminal when monitoring that the display scene of the terminal is the display scene that needs to control the frame refresh rate of the display screen. The terminal inquires the corresponding maximum frame refresh rate, namely the first target frame rate, based on the display scene identifier carried in the frame refresh rate control instruction when receiving the frame refresh rate control instruction sent by the cloud server.

In another exemplary solution, the cloud server can directly inquire the corresponding maximum frame refresh rate (namely, the first target frame refresh rate) based on the display scene when monitoring that the display scene of the terminal is the display scene that needs to control the frame refresh rate of the display screen. In addition, the first target refresh frame is carried in the frame refresh rate control instruction and sent to the terminal by the cloud server. The terminal directly acquires the first target frame rate from the frame refresh rate control instruction sent by the cloud server.

In step 320, when no user operation on the display interface is received, a second target frame rate is set as the frame refresh rate of the display screen, wherein the second target frame rate is not greater than the first target frame rate.

In some embodiments, in the present embodiment, when no user operation on the display interface is received, the terminal can dynamically adjust the frame refresh rate of the display screen with reference to the maximum frame refresh rate (namely, the first target frame rate) corresponding to the display scene of the terminal, such that the frame refresh rate of the display screen is dynamically adjusted within a range not exceeding the first target frame rate. Thus, the power consumption of the display screen is controlled in connection with the display content in the display interface of the terminal.

For example, the greatest frame refresh rate supported by the display screen can be up to 120 frames per second, and the greatest frame refresh rate corresponding to the current display scene of the terminal is 60 frames per second (that is, the first target frame rate is 60 frames per second). In this way, when the terminal displays the display interface on the current display scene, the frame refresh rate of the display screen can be dynamically set within a range of 60 frames per second and less than 60 frames per second.

In step 330, a touch event is monitored, wherein the touch event is an event generated when the terminal detects a touch operation on the display screen.

In some embodiments, after being started, an operating system of the terminal will generate a touch event and add the generated touch event to an event queue managed by a UI Application when the user performs a touch operation on the display screen. The UI Application takes the foremost event from the event queue and distributes the event to an application managed by the UI Application corresponding to the event for processing. Correspondingly, it is determined that the touch event is monitored when the application receives the event sent by the UI Application and determines that the event is the touch event based on the type of the event.

In some embodiments, the application is a system program or a third-party application configured to control the display screen of the terminal.

In some embodiments, the terminal monitors the touch even when the second target frame rate is lower than the first target frame rate.

Since monitoring of the touch event requires invoking a relevant program, certain power consumption will be caused and computing resources will be occupied. When the second target frame rate is equal to the first target frame rate, the frame refresh rate of the current display screen is the maximum frame refresh rate corresponding to the current display scene of the terminal. Even if the touch event occurs, and the frame refresh rate of the current display screen needs to be switched into the maximum frame refresh rate of the display screen, limited by the maximum frame refresh rate of the current display scene of the terminal, the frame refresh rate of the display screen will not be adjusted. Therefore, in the present embodiment, when the second target frame rate is equal to the first target frame rate, the terminal does not need to monitor the touch event. The terminal executes the step of monitoring the touch event when the second target frame rate is lower than the first target frame rate. Thus, by setting a condition for monitoring the touch event, the power consumption is reduced to some extent, and occupancy of computing resources is reduced.

In step 340, when the touch event is monitored, it is determined that a user operation on the display interface is received.

In the present embodiment, when the touch event is monitored, the application for controlling the display screen in the terminal can determine that the user executes a touch operation on the display interface.

In step 350, the first target frame rate is set as the frame refresh rate of the display screen when the user operation on the display interface is received.

In the present embodiment, the terminal sets the first target frame rate as the frame refresh rate of the display screen when receiving the touch operation by the user on the display screen.

In some embodiments, the terminal can acquire the current frame refresh rate of the display screen and compare the acquired current frame refresh rate with the first target frame rate when receiving the user operation on the display interface and setting the frame refresh rate of the display screen. If the current frame refresh rate is equal to the first target frame rate, the current frame refresh rate of the display screen will not be changed and is kept at the first target frame rate. If the current frame refresh rate is lower than the first target frame rate, the terminal adjusts the frame refresh rate of the display screen to the first target frame rate.

In the present embodiment, the terminal judges whether a user operation is received by monitoring the touch event, and sets the highest first target frame rate of the current display scene as the frame refresh rate of the display screen when determining that the user operation is received. Since a logic with which the terminal sets the frame refresh rate of the display screen is simpler and more direct than a logic with which the display interface responds to the user operation, through the solution disclosed by the present embodiment, the terminal can accomplish adjustment of the frame refresh rate of the display screen before the display interface responds to the user operation. Thus, the display interface is capable of responding to the user operation in a case that the frame refresh rate of the display screen is the highest frame refresh rate corresponding to the current display scene. Hence, the fluency of a UI interaction is guaranteed.

In some embodiments, the terminal sets the first target frame rate as the frame refresh rate of the display screen when the user operation corresponding to the touch event is a valid operation, wherein the valid operation is an operation that triggers effective updating of content on the display interface.

In the present embodiment, when the user performs a touch operation on the display screen, if the terminal receives the touch operation and responds to the user operation, updating of the content on the display interface of the terminal is triggered. Then, the user operation can be taken as a valid operation. Otherwise, if the touch operation detected by the terminal does not trigger updating of content on the display interface, the terminal will take the touch operation as an invalid operation.

In a possible case, after the user performs a touch operation on the display screen, the terminal receives the touch operation, and may not respond to this operation. That is, the touch operation does not trigger updating of content on the display interface. For example, on a locked screen interface, the user clicks the display screen, but the touched region is not a region for triggering an unlocking prompt or for opening an unlocking interface, and then the display screen will not respond to the clicking operation by the user. At this time, the user operation will be regarded as an invalid operation.

Alternatively, in another possible case, the terminal used by the user comprises a curved screen. The terminal may not respond to a clicking operation by the user on an edge of the curved screen (that is, the clicking operation on the edge of the curved screen does not trigger updating of content on the display screen). However, the terminal may respond to a sliding operation by the user on the edge of the curved screen (that is, the sliding operation on the edge of the curved screen triggers updating of content on the display screen). At this time, the terminal may regard a clicking operation on the edge of the curved screen as an invalid operation and regard a sliding operation on the edge of the curved screen as a valid operation.

In the present embodiment, since an invalid operation will not trigger updating of content on the display interface of the terminal, and will not involve response by the display interface to the user operation, in order to avoid unnecessary adjustment of the frame refresh rate, the terminal can judge whether a touch operation is a valid operation when receiving the touch operation on the display interface. If yes, the frame refresh rate of the display screen is adjusted to the first target frame rate; otherwise, the touch operation is regarded as an invalid operation, and the frame refresh rate of the display screen will not be adjusted by the terminal, so as to avoid increasing the frame refresh rate of the display screen in case of a non-UI interaction, thereby further improving effect of saving electricity.

It should be noted that the present embodiment is described by merely taking that the user operation is the touch operation generated, when the user touches the display screen through the display interface, as an example. In some embodiments, the user operation may be other types of operations capable of triggering updating of the display interface, in addition to the touch operation. For example, the user operation may be a button operation, a voice operation, a gesture operation (an operation that the user triggers a response by identification induction between the terminal and a gesture of the user without actually touching the display screen), an expression operation, etc.

For example, when the user interacts with the display interface through a button operation, the terminal detects the button operation of the user. If the button operation is an operation that triggers updating of content on the display interface, such as an operation that lightens up the screen, the terminal can set the first target frame rate as the frame refresh rate of the display screen.

Alternatively, when the user interacts with the display interface through a voice operation, the terminal receives a voice instruction of the user and invokes a relevant application to respond to the voice instruction. If the voice instruction triggers updating of content on the display interface, for example, the screen is aroused by the voice instruction, the terminal can set the first target frame rate as the frame refresh rate of the display screen.

Alternatively, when the user interacts with the display interface through a gesture operation, if the terminal detects that the gesture operation of the user is an operation that triggers updating of content on the display interface, for example, the user flips over or slides up and down on the current display interface through the gesture operation, the terminal can set the first target frame rate as the frame refresh rate of the display screen.

Alternatively, when the user interacts with the display interface through a facial expression/action, if the terminal detects that the facial expression/action of the user is an operation that triggers updating of content on the display interface, for example, identity authentication is performed by the facial expression or facial action, the terminal can set the first target frame rate as the frame refresh rate of the display screen.

As such, according to the method for controlling the frame refresh rate of the screen, by acquiring the maximum frame refresh rate corresponding to the display scene of the terminal, setting the frame refresh rate of the display screen to be not greater than the maximum target frame rate corresponding to the display scene, and setting the maximum frame refresh rate corresponding to the display scene of the terminal as the frame refresh rate of the display screen when the user operation is received, the frame refresh rate of the display screen can be adjusted if the user operation is received while the power consumption of the display screen of the terminal is controlled so as to guarantee the fluency of an interface interaction. Therefore, the response effect to the interface interaction is guaranteed while the power consumption of the display screen is controlled.

Figure 4:
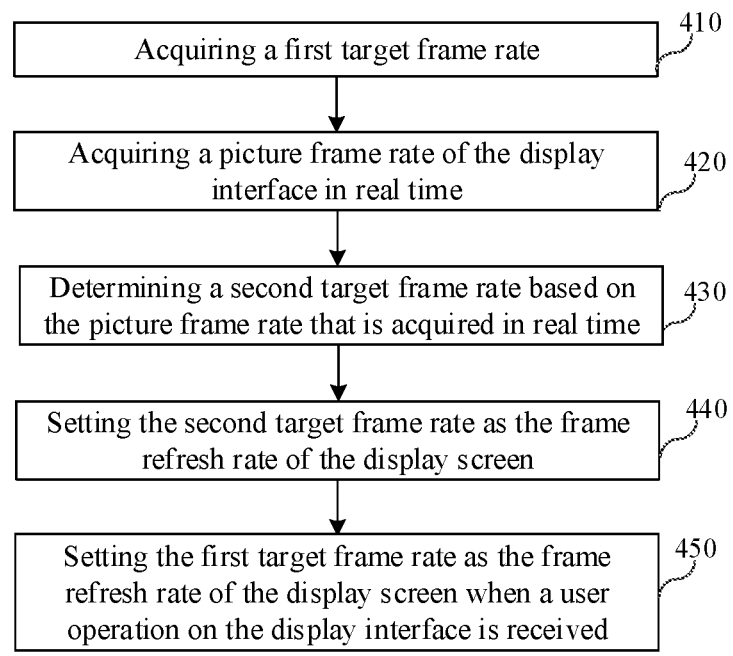
FIG. 4 is a flowchart of a method for controlling a frame refresh rate of a screen in accordance with yet another exemplary embodiment.

FIG. 4 is a flowchart of a method for controlling a frame refresh rate of a screen in accordance with one exemplary embodiment. The method is executed by a terminal comprising a display screen. For example, the terminal can be a terminal as illustrated in FIG. 1. As illustrated in FIG. 4, the method for controlling the frame refresh rate of the screen comprises the following steps.

In step 410, a first target frame rate is acquired. The first target frame rate is a maximum frame refresh rate corresponding to a display scene of the terminal. The display scene is a scene classified based on a type of a display interface in the display screen.

Referring to the description of step 310 in the embodiment illustrated in FIG. 3 for the execution process of step 410, which will not be elaborated herein.

In step 420, a picture frame rate of the display interface is acquired in real time.

The picture frame rate of the display interface refers to a frequency at which different display contents in the display interface continuously appear on a display or a screen.

In a possible embodiment, the display scene of the terminal is a video playing scene, and the maximum frame refresh rate (namely, the first frame refresh rate) of the display screen on the video playing scene is 60 frames per second. However, a picture frame rate of a video source for video playing may be more than or lower than the maximum frame refresh rate on the video playing scene. For example, a frame refresh rate of the video source may be 70 frames per second or 50 frames per second.

Alternatively, the display scene of the terminal is a reading and browsing scene, and the maximum frame refresh rate of the display screen on the reading and browsing scene is 40 frames per second. However, a picture frame rate of an interface of an application that supports reading and browsing may be more than or lower than the maximum frame refresh rate on the reading and browsing scene. For example, the picture frame rate of the interface of the application may be 35 frames per second or 25 frames per second.

Alternatively, the display scene of the terminal is a UI interaction scene. The maximum frame refresh rate of the display screen on the UI interaction scene is 120 frames per second. However, a picture frame rate of an interface of an application that executes a UI interaction may be more than or lower than the maximum frame refresh rate on the UI interaction scene. For example, the picture frame rate of the interface of the application may be 130 frames per second or 110 frames per second.

It should be noted that the solution of the present embodiment merely provides a possible case, and the present embodiment does not limit the display scene, the maximum frame refresh rate of the display scene on the display screen or the picture frame rate under the display scene.

Since the picture frame rate of the display interface and the frame refresh rate of the display screen may not be synchronous, the display screen is non-uniform in refresh frame and the display interface is not displayed smoothly. In the present embodiment, the terminal can acquire the picture frame rate of the display interface in real time by the following steps when controlling the frame refresh rate of the display screen:

acquiring a refresh time of n picture frames recently displayed in the display interface, wherein n is an integer more than or equal to 2; acquiring a total refresh duration of the n picture frames based on the refresh time of the n picture frames; and acquiring a picture frame rate of the display interface based on the total refresh duration of the n picture frames.

In a possible embodiment of the present disclosure, the terminal can calculate the picture frame rate of the display screen according to the following formula:

$$f_1 = \frac{n_1}{t_1},$$

wherein $f_1$ is the picture frame rate, $n_1$ is the number of recently displayed picture frames, $t_1$ is the total refresh duration of the $n_1$ picture frames. The terminal can acquire the picture frame rate of the display interface based on the abovementioned calculation formula.

In some embodiments, acquiring the picture frame rate of the display interface in real time may comprise the following steps:

acquiring the number of picture frames recently displayed in the display interface within a specified duration; and acquiring the picture frame rate of the display interface based on the specified duration and the number of picture frames recently displayed within the specified duration.

In another possible embodiment of the present disclosure, the terminal can calculate the picture frame rate of the display screen by the following formula:

$$f_2 = \frac{n_2}{t_2},$$

wherein $f_2$ is the picture frame rate, $t_2$ is time for which the picture frame is displayed recently, and $n_2$ is the number of picture frames refreshed within $t_2$. The terminal can acquire the picture frame rate of the display interface based on this formula.

In some embodiments, the total refresh duration of the n picture frames is acquired based on the refresh time of the n picture frames when a time interval between any two adjacent picture frames in the n picture frames is not greater than an interval threshold.

The interval threshold refers to a maximum value of the time interval between two adjacent refreshed picture frames. It indicates that the two picture frames are continuous when the time interval between the two adjacent picture frames is not greater than the interval threshold. It indicates that the two picture frames are discontinuous when the time interval between the two adjacent picture frames is greater than the interval threshold.

In a possible embodiment of the present disclosure, when a time interval between a first picture frame and a second picture frame which are adjacent to each other is greater than the interval threshold, that is, the first picture frame and the second picture frame are discontinuous, the terminal can remove a previous statistical value, comprising a statistic of the number of picture frames, a statistic of time for which the picture frame is refreshed, etc., and starting from the second picture frame, re-count the number of the picture frames and the time for which the picture frame is refreshed, such that the total refresh duration of the n picture frames is acquired based on the re-counted refresh time of the n picture frames.

For example, it is assumed that the interval threshold set by the terminal is 70 milliseconds. If the time interval between the first picture frame and the second picture frame is less than or equal to 70 milliseconds, it is believed that the first picture frame and the second picture frame are continuous, and the total refresh duration of the n picture frames is acquired based on the counted refresh time of the n picture frames.

If the time interval between the first picture frame and the second picture frame is more than 70 milliseconds, it is believed that the first picture frame and the second picture frame are discontinuous. In a possible scene, when the first picture frame and the second picture frame are discontinuous, a pause operation and the like are performed on a currently played video on a video playing scene. At this time, the terminal remove the previous statistical value, recounts from the second picture frame, and acquires the total refresh duration of the n picture frames based on the recounted refresh time of the n picture frames.

In step 430, a second target frame rate is determined based on the picture frame rate that is acquired in real time.

In some embodiments, the terminal can determine a value of the picture frame rate as a value of the second target frame rate.

In the present embodiment, the terminal can switch the second target frame rate in real time and adjust the second target frame rate based on changes of the picture frame rate.

For example, the terminal sets the second target frame rate as the maximum frame refresh rate on the display scene when detecting that the picture frame rate is not less than the maximum frame refresh rate on the display scene. For example, when the current picture frame rate is 70 frames per second and the maximum frame refresh rate on the current display scene is 60 frames per second, the second target frame rate is set as 60 frames per second.

The terminal sets the picture frame rate that is acquired in real time as the second target frame rate when detecting that the picture frame rate is lower than the maximum frame refresh rate corresponding to the display scene and more than a minimum frame refresh rate on the display scene. For example, when the picture frame rate that is acquired in real time is 50 frames per second, the maximum frame refresh rate on the current display scene is 60 frames per second, and the minimum frame refresh rate is 20 frames per second, the terminal can set 50 frames per second as the second target frame rate.

The terminal sets the second target frame rate as the minimum frame refresh rate corresponding to the display scene when detecting that the picture frame rate is lower than the minimum frame refresh rate of the display scene. For example, when the current picture frame rate is 10 frames per second, and the minimum frame refresh rate on the current display scene is 20 frames per second, the terminal sets the second target frame rate as 20 frames per second.

In some embodiments, in the present embodiment, the terminal can set the minimum frame refresh rate corresponding to the display scene as the second target frame rate when detecting that the picture frame is not refreshed for a long time, namely, when detecting that the current picture frame is not refreshed for a period of time exceeding the time threshold. For example, when the maximum frame refresh rate on the current display scene is 60 frames per second, the minimum frame refresh rate is 20 frames per second, and the time threshold set by the terminal is 50 milliseconds, the terminal can set 20 frames per second as the second target frame rate when the picture frame in the display interface is not refreshed for more than 50 milliseconds (for example, in a pause status on the video playing scene).

In step 440, the second target frame rate is set as the frame refresh rate of the display screen when no user operation on the display interface is received.

In step 450, the first target frame rate is set as the frame refresh rate of the display screen when a user operation on the display interface is received.

Steps 440 to 450 are similar to steps 320 and 350 of the embodiment illustrated in FIG. 3, and thus, will not be elaborated herein.

As such, according to the method for controlling the frame refresh rate of the screen, by acquiring the maximum frame refresh rate corresponding to the display scene of the terminal, setting the frame refresh rate of the display screen to be not greater than the maximum target frame rate corresponding to the display scene, and setting the maximum frame refresh rate corresponding to the display scene of the terminal as the frame refresh rate of the display screen when receiving a user operation, the frame refresh rate of the display screen can be adjusted if the user operation is received while the power consumption of the display screen of the terminal is controlled so as to guarantee the fluency of an interface interaction. Therefore, the response effect to the interface interaction is guaranteed while the power consumption of the display screen is controlled.

Figure 5:
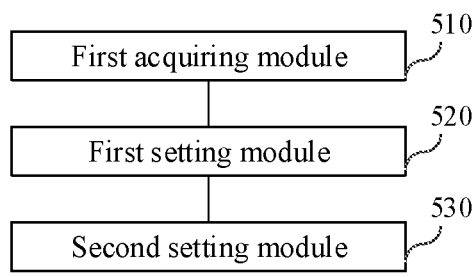
FIG. 5 is a block diagram of a device configured to control a frame refresh rate of a screen in accordance with one exemplary embodiment.

FIG. 5 is a block diagram of a device for controlling a frame refresh rate of a screen in accordance with one exemplary embodiment. The device may be applicable to a terminal comprising a display screen to execute all or part of steps of the method defined in any of the embodiments illustrated in FIG. 2, FIG. 3 and FIG. 4. The terminal can be the terminal illustrated in FIG. 1. As illustrated in FIG. 5, the device for controlling the frame refresh rate of the screen can comprise:

a first acquiring module 510, configured to acquire a first target frame rate, wherein the first target frame rate is a maximum frame refresh rate corresponding to a display scene of the terminal, and the display scene is a scene classified based on a type of a display interface in the display screen;

a first setting module 520, configured to, when no user operation on the display interface is received, set a second target frame rate that is not greater than the first target frame rate as a frame refresh rate of the display screen; and a second setting module 530, configured to set the first target frame rate as the frame refresh rate of the display screen when a user operation on the display interface is received.

In some embodiments, the display screen is a touch display screen. The device further comprises:

a monitoring module, configured to monitor a touch event before the second setting module 530 sets the first target frame rate as the frame refresh rate of the display screen, wherein the touch event is an event generated when the terminal detects a touch operation on the display screen; and a first determining module, configured to, when the touch event is monitored, determine that the user operation on the display interface is received.

In some embodiments, the second setting module is configured to:

set the first target frame rate as the frame refresh rate of the display screen when the user operation corresponding to the touch event is a valid operation, wherein the valid operation is an operation that triggers updating of content on the display interface.

In some embodiments, the monitoring module is configured to:

monitor the touch event when the second target frame rate is less than the first target frame rate.

In some embodiments, the device further comprises:

a second acquiring module, configured to acquire a picture frame rate of the display interface in real time before the first setting module sets the second target frame rate as the frame refresh rate of the display screen, wherein the picture frame rate is a frequency at which a picture frame on the display interface changes; and a second determining module, configured to determine the second target frame rate based on the picture frame rate that is acquired in real time.

In some embodiments, the second determining module is configured to determine a value of the picture frame rate as a value of the second target frame rate.

In some embodiments, the second acquiring module comprises:

a first acquiring sub-module, configured to acquire a refresh time of n picture frames recently displayed on the display interface, wherein n is an integer more than or equal to 2;

a second acquiring sub-module, configured to acquire a total refresh duration of the n picture frames based on the refresh time of the n picture frames; and a third acquiring sub-module, configured to acquire a picture frame rate of the display interface based on the total refresh duration of the n picture frames.

In some embodiments, the second acquiring sub-module is configured to:

acquire the total refresh duration of the n picture frames based on the refresh time of the n picture frames when a time interval between any two adjacent picture frames in the n pictures is not greater than an interval threshold.

In some embodiments, the first acquiring module comprises:

an instruction receiving sub-module, configured to receive a frame refresh rate control instruction sent by a cloud server, wherein the frame refresh rate control instruction is an instruction sent by the cloud server when monitoring that a display scene of the terminal changes; and a fourth acquiring sub-module, configured to acquire the first target frame rate indicated by the frame refresh rate control instruction.

As such, in the device for controlling the frame refresh rate of the screen according to the embodiments of the present disclosure, by acquiring the maximum frame refresh rate corresponding to the display scene of the terminal, setting the frame refresh rate of the display screen to be not greater than the maximum target frame rate corresponding to the display scene, and setting the maximum frame refresh rate corresponding to the display scene of the terminal as the frame refresh rate of the display screen as when receiving the user operation, the frame refresh rate of the display screen can be adjusted if the user operation is received while the power consumption of the display screen of the terminal is controlled so as to guarantee the fluency of an interface interaction. Therefore, the response effect to the interface interaction is guaranteed while the power consumption of the display screen is controlled.

It should be noted that when the device provided by the foregoing embodiment implements its functions, partitioning of the functional modules described above is merely illustrated. In practice, the above-mentioned functions can be distributed to and completed by the different functional modules according to actual requirements. That is, the detail and the structure of the device are classified into the different functional modules for completing all or part of the functions described above.

With regard to the device provided by the foregoing embodiment, the specific manner in which the respective modules perform the operations has been described in detail in the embodiments relating to the method, and will not be elaborated herein.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Embodiments of the present disclosure provide an apparatus configured to control a frame refresh rate of a screen. The apparatus is applicable to a terminal comprising a display screen to execute all or part of steps of the method defined in any of the embodiments illustrated in FIG. 2, FIG. 3 and FIG. 4. The terminal can be the terminal illustrated in FIG. 1. The apparatus configured to control the frame refresh rate of the screen can comprise:

a processor; and a memory configured to store an instruction executable by the processor;

wherein the processor is configured to:

acquire a first target frame rate, wherein the first target frame rate is a maximum frame refresh rate corresponding to a display scene of the terminal, and the display scene is a scene classified based on a type of a display interface in the display screen;

when no user operation on the display screen is received, set a second target frame rate that is not greater than the first target frame rate as a frame refresh rate of the display screen; and set the first target frame rate as the frame refresh rate of the display screen when receiving a user operation on the display interface.

In some embodiments, the display screen is a touch display screen. Before setting the first target frame rate as the frame refresh rate of the display screen when the user operation on the display interface is received, the method further comprises:

monitoring a touch event, wherein the touch event is an event generated when the terminal detects a touch operation on the display screen; and when the touch event is monitored, determining that the user operation on the display interface is received.

In some embodiments, setting the first target frame rate as the frame refresh rate of the display screen comprises:

setting the first target frame rate as the frame refresh rate of the display screen when the user operation corresponding to the touch event is a valid operation.

The valid operation is an operation that triggers effective updating of content on the display interface.

In some embodiments, monitoring the touch event comprises:

monitoring the touch event when the second target frame rate is lower than the first target frame rate.

In some embodiments, before setting the second target frame rate as the frame refresh rate of the display screen, the method further comprises:

acquiring a picture frame rate of the display interface in real time, wherein the picture frame rate is a frequency at which a picture frame on the display interface changes; and determining the second target frame rate based on the picture frame rate that is acquired in real time.

In some embodiments, determining the second target frame rate based on the picture frame rate that is acquired in real time comprises:

determining a value of the picture frame rate as a value of the second target frame rate.

In some embodiments, acquiring the picture frame rate of the display interface in real time comprises:

acquiring a refresh time of n picture frames recently displayed on the display interface, wherein n is an integer more than or equal to 2;

acquiring a total refresh duration of the n picture frames based on the refresh time of the n picture frames; and acquiring a picture frame rate of the display interface based on the total refresh duration of the n picture frames.

In some embodiments, acquiring the total refresh duration of the n picture frames based on the refresh time of the n picture frames comprises:

acquiring the total refresh duration of the n picture frames based on the refresh time of then picture frames when a time interval between any two adjacent picture frames in the n picture frames is not greater than an interval threshold.

In some embodiments, acquiring the first target frame rate comprises:

receiving a frame refresh rate control instruction sent by a cloud server, wherein the frame refresh rate control instruction is an instruction sent by the cloud server when monitoring that a display scene of the terminal changes; and acquiring the first target frame rate indicated by the frame refresh rate control instruction.

As such, in the apparatus configured to control the frame refresh rate corresponding to the display scene of the terminal according to the embodiments of the present disclosure, by acquiring the maximum frame refresh rate corresponding to the display scene of the terminal, setting the frame refresh rate of the display screen not to be greater than the maximum target frame rate corresponding to the display scene, and setting the maximum frame refresh rate corresponding to the display scene of the terminal as the frame refresh rate of the display screen when the user operation is received, the frame refresh rate of the display screen can be adjusted if the user operation is received while the power consumption of the display screen of the terminal is controlled so as to guarantee the fluency of the interface interaction. Therefore, the response effect to the interface interaction is guaranteed while the power consumption of the display screen is controlled.

Figure 6:
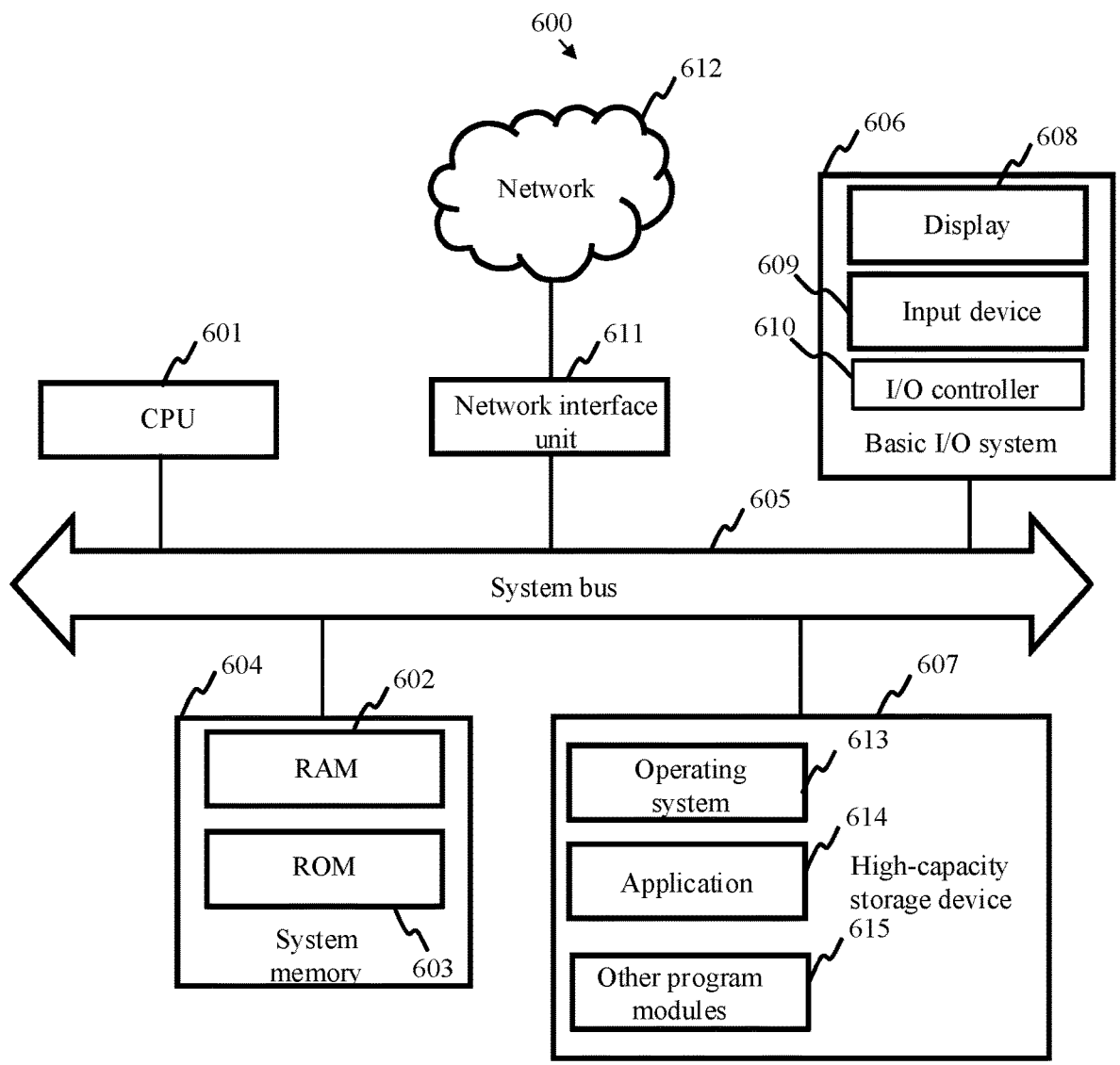
FIG. 6 is a schematic structural diagram of a computer device in accordance with one exemplary embodiment.

FIG. 6 is a schematic structural diagram of a computer apparatus in accordance with one exemplary embodiment. The computer apparatus can be implemented as the above-mentioned terminal and can also be implemented as the terminal comprising the display screen in the foregoing solution of the present disclosure. The computer apparatus 600 comprises a central processing unit (CPU) 601, a system memory 604 comprising a random-access memory (RAM) 602 and a read only memory (ROM) 603, and a system bus 605 connecting the system memory 604 and the CPU 601. The computer apparatus 600 further comprises a basic input/output system (I/O system) 606 which facilitates transmission of information between various components within a computer, and a high-capacity storage device 607 for storing an operating system 613, an application 614 and other program modules 615.

The basic I/O system 606 comprises a display 608 for displaying information and an input device 609, such as a mouse and a keyboard, for a user to input information. Both the display 608 and the input device 609 are connected to the CPU 601 through an I/O controller 610 connected to the system bus 605. The basic I/O system 606 can further comprise the I/O controller 610 for receiving and processing input from a plurality of other devices, such as a keyboard, a mouse and an electronic stylus. Similarly, the I/O controller 610 further provides output to an output device, such as a display screen, a printer or other types.

The high-capacity storage device 607 is connected to the CPU 601 through a high-capacity storage controller (not shown) connected to the system bus 605. The high-capacity storage device 607 and its associated computer-readable medium provide non-volatile storage for the computer apparatus 600. That is, the high-capacity storage device 607 can comprise a computer-readable medium (not shown), such as a hard disk or a CD-ROM drive.

Without loss of generality, the computer-readable medium can comprise a computer storage medium and a communication medium. The computer storage medium comprises volatile and non-volatile, removable and non-removable media implemented in any method or technology for storage of information such as a computer-readable instruction, a data structure, a program module or other data. The computer storage medium comprises a RAM, an ROM, an EPROM, an EEPROM, a flash memory or other solid-state storage technologies; a CD-ROM, DVD or other optical storage; and a tape cartridge, a magnetic tape, a magnetic disk storage or other magnetic storage devices. Of course, it will be known by one of ordinary skill in the art that the computer storage medium is not limited to above. The system memory 604 and the high-capacity storage device 607 described above can be collectively referred to as the memory.

According to various embodiments of the present disclosure, the computer apparatus 600 can further be connected to a remote computer on a network through the network, such as the Internet, for operation. That is, the computer apparatus 600 can be connected to the network 612 through a network interface unit 611 connected to the system bus 605, or can be connected to other types of networks or remote computer systems (not shown) through the network interface unit 611.

The memory further comprises one or more programs stored on the memory. The CPU 601 implements all or part of the steps of the method illustrated in FIG. 2, FIG. 3 or FIG. 4 by executing the one or more programs.

It will be understood by one of ordinary skill in the art that the structure illustrated in FIG. 6 does not constitute a limitation on the computer apparatus 600, and may comprise more or less components than those illustrated, or combine some components or adopt different component arrangements.

One of ordinary skill in the art will appreciate that in one or more examples described above, the functions described in the embodiments of the present disclosure can be implemented in hardware, software, firmware, or any combination thereof. When implemented in software, the functions can be stored in a computer-readable medium or transmitted as one or more instructions or codes on the computer-readable medium. The computer-readable medium comprises a computer storage medium and a communication medium comprising any medium that facilitates transfer of a computer program from one location to another. The storage medium can be any available medium that can be accessed by a general-purpose computer or a dedicated computer.

In one exemplary embodiment, there is also provided a non-transitory computer-readable storage medium comprising an instruction, at least one instruction, at least one segment of program and a code set or an instruction set stored thereon and loaded and executed by a processor to implement all or part of the steps of the method illustrated in any of the embodiments illustrated in FIG. 2, FIG. 3 and FIG. 4. For example, the non-transitory computer-readable storage medium may be a read only memory (ROM), a random-access memory (RAM), a CD-ROM, a magnetic tape, a floppy disk, an optical data storage device, or the like.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, a flexible display, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for controlling a frame refresh rate of a screen, applied to a terminal comprising a display screen, wherein the method comprises:
   acquiring a first target frame rate, wherein the first target frame rate is a maximum frame refresh rate corresponding to a display scene on the terminal, and the display scene is a scene classified based on a type of a display interface on the display screen;
   setting a second target frame rate as a frame refresh rate of the display screen which is not greater than the first target frame rate; and
   setting the first target frame rate as the frame refresh rate of the display screen when receiving a user operation on the display interface,
   wherein prior to the setting the second target frame rate as the frame refresh rate of the display screen, the method further comprises:
   acquiring a picture frame rate on the display interface in real time, wherein the picture frame rate is a frequency at which a picture frame on the display interface changes; and
   determining the second target frame rate based on the picture frame rate that is acquired in real time,
   wherein the acquiring the picture frame rate of the display interface in real time comprises:
   acquiring a refresh time of n picture frames recently displayed on the display interface, wherein n is an integer greater than or equal to 2;
   acquiring a total refresh duration of the n picture frames based on the refresh time of the n picture frames; and
   acquiring the picture frame rate of the display interface based on the total refresh duration of the n picture frames, and
   wherein the acquiring the total refresh duration of the n picture frames based on the refresh time of the n picture frames comprises:
   acquiring the total refresh duration of the n picture frames based on the refresh time of the n picture frames when a time interval between any two adjacent picture frames in the n picture frames is not greater than an interval threshold.

2. The method according to claim 1, wherein the display screen is a touch display screen, and prior to the setting the first target frame rate as the frame refresh rate of the display screen when receiving the user operation on the display interface, the method further comprises:
   monitoring a touch event which is an event generated when detecting a touch operation on the display screen by the terminal; and
   when the touch event is detected, determining that the user operation on the display interface is received.

3. The method according to claim 2, wherein the setting the first target frame rate as the frame refresh rate of the display screen comprises:
   setting the first target frame rate as the frame refresh rate of the display screen when the user operation corresponding to the touch event is a valid operation, wherein the valid operation is an operation which triggers effective updating of content on the display interface.

4. The method according to claim 2, wherein the monitoring the touch event comprises:
   monitoring the touch event when the second target frame rate is lower than the first target frame rate.

5. The method according to claim 1, wherein the determining the second target frame rate based on the picture frame rate that is acquired in real time comprises:
   determining a value of the picture frame rate as a value of the second target frame rate.

6. The method according to claim 1, wherein the acquiring the first target frame rate comprises:
   receiving a frame refresh rate control instruction sent by a cloud server, wherein the frame refresh rate control instruction is an instruction sent by the cloud server which monitors that the display scene on the terminal changes; and
   acquiring the first target frame rate indicated by the frame refresh rate control instruction.

7. An apparatus configured to control a frame refresh rate of a display screen, wherein the apparatus is applicable to a terminal comprising the display screen and comprises:
   a processor; and
   memory configured to store an instruction executable by the processor, wherein
   the processor is configured to:
   acquire a first target frame rate, wherein the first target frame rate is a maximum frame refresh rate corresponding to a display scene of the terminal, and the display scene is a scene classified based on a type of a display interface on the display screen;
   set a second target frame rate that is not greater than the first target frame rate as a frame refresh rate of the display screen; and
   set the first target frame rate as the frame refresh rate of the display screen when receiving a user operation on the display interface,
   wherein before configured to set the second target frame rate as the frame refresh rate of the display screen, the processor is further configured to:
   acquire a picture frame rate on the display interface in real time, wherein the picture frame rate is a frequency at which a picture frame on the display interface changes; and
   determine the second target frame rate based on the picture frame rate that is acquired in real time,
   wherein that the processor is further configured to acquire the picture frame rate of the display interface in real time comprises that the processor is configured to:
   acquire a refresh time of n picture frames recently displayed on the display interface, wherein n is an integer greater than or equal to 2;
   acquire a total refresh duration of the n picture frames based on the refresh time of the n picture frames; and
   acquire the picture frame rate of the display interface based on the total refresh duration of the n picture frames, and
   wherein that the processor is configured to acquire the total refresh duration of the n picture frames based on the refresh time of the n picture frames comprises that the processor is configured to acquire the total refresh duration of the n picture frames based on the refresh time of the n picture frames when a time interval between any two adjacent picture frames in the n picture frames is not greater than an interval threshold.

8. The apparatus according to claim 7, the display screen is a touch display screen, and before configured to set the first target frame rate as the frame refresh rate of the display screen when receiving the user operation on the display interface, the processor is further configured to:

monitor a touch event which is an event generated when detecting a touch operation on the display screen by the terminal; and determine that the user operation on the display interface is received when the touch event is detected.

9. The apparatus according to claim 8, wherein that the processor is configured to setting the first target frame rate comprises the processor is configured to set the first target frame rate as the frame refresh rate of the display screen when the user operation corresponding to the touch event is a valid operation, wherein the valid operation is an operation which triggers effective updating of content on the display interface.

10. The apparatus according to claim 8, wherein that the processor is configured to monitor the touch event comprises:

the processor is configured to monitor the touch event when the second target frame rate is lower than the first target frame rate.

11. The apparatus according to claim 7, wherein that the processor is configured to determine the second target frame rate based on the picture frame rate that is acquired in real time comprises the processor is configured to determine a value of the picture frame rate as a value of the second target frame rate.

12. The apparatus according to claim 7, wherein that the processor is configured to acquire the first target frame rate comprises that the processor is configured to:

receive a frame refresh rate control instruction sent by a cloud server, wherein the frame refresh rate control instruction is an instruction sent by the cloud server which monitors that the display scene on the terminal changes; and acquire the first target frame rate indicated by the frame refresh rate control instruction.

13. A display system comprising the apparatus according to claim 7, further comprising a cloud server and the terminal, wherein the cloud server is configured to monitor the display scene of the terminal and, upon detecting that the display scene of the terminal has changed, match the changed display scene with a target display scene that needs to control the frame refresh rate of the display screen, and upon successful matching, send a frame refresh rate control instruction to the terminal; and wherein the terminal is configured to acquire the maximum frame refresh rate corresponding to the display scene of the terminal based on the frame refresh rate control instruction to thereby control power consumption of the display screen of the terminal while guarantying fluency of an interface interaction.

14. A non-transitory computer-readable storage medium, wherein at least one instruction, at least one segment of program, a code set or an instruction set are stored on the storage medium and loaded and executed by a processor, when the processor executing the at least one instruction, the at least one segment of program, the code set or the instruction set, the processor is configured to:

acquire a first target frame rate, wherein the first target frame rate is a maximum frame refresh rate corresponding to a display scene of the terminal, and the display scene is a scene classified based on a type of a display interface on the display screen;

set a second target frame rate as a frame refresh rate of the display screen as that is not greater than the first target frame rate; and set the first target frame rate as the frame refresh rate of the display screen when receiving a user operation on the display interface, wherein prior to that the processor is configured to set the second target frame rate as the frame refresh rate of the display screen, the processor is configured to:

acquire a picture frame rate on the display interface in real time, wherein the picture frame rate is a frequency at which a picture frame on the display interface changes; and determine the second target frame rate based on the picture frame rate that is acquired in real time, wherein that the processor is configured to acquire the picture frame rate of the display interface in real time comprises that the processor is configured to:

acquire a refresh time of n picture frames recently displayed on the display interface, wherein n is an integer greater than or equal to 2;

acquire a total refresh duration of the n picture frames based on the refresh time of the n picture frames; and acquire the picture frame rate of the display interface based on the total refresh duration of the n picture frames, and wherein that the processor is configured to acquire the total refresh duration of the n picture frames based on the refresh time of the n picture frames comprises that the processor is configured to:

acquire the total refresh duration of the n picture frames based on the refresh time of the n picture frames when a time interval between any two adjacent picture frames in the n picture frames is not greater than an interval threshold.

* * * * *